(12) United States Patent
Kitamura

(10) Patent No.: US 12,190,264 B2
(45) Date of Patent: Jan. 7, 2025

(54) TELEPHONE ANSWERING SERVICE SUPPORT SYSTEM, TELEPHONE ANSWERING SERVICE SUPPORT METHOD, AND PROGRAM

(71) Applicant: RAKUTEN GROUP, INC., Tokyo (JP)

(72) Inventor: Kazutaka Kitamura, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 106 days.

(21) Appl. No.: 17/358,026

(22) Filed: Jun. 25, 2021

(65) Prior Publication Data

US 2022/0004971 A1 Jan. 6, 2022

(30) Foreign Application Priority Data

Jul. 1, 2020 (JP) .................................. 2020-113936

(51) Int. Cl.
    *G06Q 10/0631* (2023.01)
    *G06N 20/00* (2019.01)
    *G10L 15/26* (2006.01)
    *H04M 3/51* (2006.01)

(52) U.S. Cl.
    CPC ..... *G06Q 10/063114* (2013.01); *G06N 20/00* (2019.01); *G10L 15/26* (2013.01); *H04M 3/5175* (2013.01); *H04M 3/5183* (2013.01); *H04M 2203/402* (2013.01)

(58) Field of Classification Search
    CPC .......... G06Q 10/063114; G06N 20/00; G10L 15/26; H04M 3/5175; H04M 3/5183; H04M 2203/402
    USPC ....................................................... 705/7.15
    See application file for complete search history.

(56) References Cited

U.S. PATENT DOCUMENTS

| | | | | |
|---|---|---|---|---|
| 2006/0203993 | A1* | 9/2006 | Busey | H04M 7/0027 |
| | | | | 379/265.09 |
| 2014/0180697 | A1* | 6/2014 | Torok | G06F 16/61 |
| | | | | 704/275 |
| 2018/0341891 | A1* | 11/2018 | Setchell | G06Q 10/10 |
| 2021/0049529 | A1* | 2/2021 | White | G06Q 10/0631 |

FOREIGN PATENT DOCUMENTS

JP         2015-141613 A    8/2015

OTHER PUBLICATIONS

"Visualized Voice Service System by VSXML" to Chou et al., Sep. 3, 2008 (Year: 2008).*

* cited by examiner

*Primary Examiner* — Charles Guiliano
*Assistant Examiner* — Po Han Lee
(74) *Attorney, Agent, or Firm* — HEA Law PLLC

(57) ABSTRACT

A telephone answering service support system including a task data DB 14g that stores a plurality of task data items, each task data item including a task name of a task in a telephone answering service and speech data indicating speech to be made in the task, a task list obtaining unit 14d that displays the task name on a display of an operator of the telephone answering service, and a task determining unit 14e that determines which task has been completed among the plurality of tasks corresponding to the plurality of task data items, based on voice of the operator and the speech data, and executes, in a case where it is determined that any of the tasks has been completed, display control for distinguishing the task name of the task that is determined to have been completed from other task names.

14 Claims, 8 Drawing Sheets

FIG.5

| 001 | |
|---|---|
| A01 NAME | "MAY I HAVE YOUR NAME?" , . . . . . . . . |
| A02 DATE OF BIRTH | "WHAT IS YOUR DATE OF BIRTH?" , . . . . . . . . |
| A03 REGISTERED MAIL ADDRESS | "CAN I ASK YOUR REGISTERED MAIL ADDRESS?" , .... |

TELEPHONE ANSWERING SERVICE SUPPORT SYSTEM, TELEPHONE ANSWERING SERVICE SUPPORT METHOD, AND PROGRAM

CROSS-REFERENCE TO RELATED APPLICATION

The present application claims priority from Japanese patent application JP 2020-113936 filed on Jul. 1, 2020, the content of which is hereby incorporated by reference into this application.

BACKGROUND OF THE INVENTION

1. Field of the Invention

The present invention relates to a telephone answering service support system, a telephone answering service support method, and a program, and particularly to information technology for supporting operators engaged in telephone answering service.

2. Description of the Related Art

In telephone answering service at a call center, for example, an operator who receives a call from a customer needs to complete tasks of guiding into or asking the customer questions about predetermined items. For example, when receiving an inquiry from a customer that the customer cannot log in to the company's site, the operator asks the customer about information such as the customer's name and date of birth for confirmation of the customer's identity. After confirming that the information has been correctly answered, the operator provides the login procedure to the customer.

In this regard, the system disclosed in JP 2015-141613 A shows a plurality of questions to customers on the display, thereby supporting operators in the telephone answering service. In this system, when the customer answers one question, the operator manually selects an answer that matches the customer's answer from the list of answers displayed on the display.

In the system described in JP 2015-141613 A, the operator manually selects the answer for the customer. Such work is complicated to do while having a conversation with the customer. If the operator puts off selecting the answer, the operator may forget which question has been asked.

SUMMARY OF THE INVENTION

One or more embodiments of the present invention have been conceived in view of the above, and an object thereof is to provide a telephone answering service support system, a telephone answering service support method, and a program for supporting an operator for performing all of tasks, such as asking questions and guiding customers, without omission.

In order to solve the above-mentioned problems, a telephone answering service support system includes task data storing means for storing a plurality of task data items, each task data item including a task name of a task in a telephone answering service, and speech data indicating speech to be made in the task, task display means for displaying a task name included in each of the plurality of task data items on a display of an operator engaged in the telephone answering service, determining means for determining which task has been completed among the plurality of tasks corresponding to the plurality of task data items, based on voice of the operator in the telephone answering service and speech data included in each of the plurality of task data items, and determination result display means for executing, in a case where it is determined that any of the tasks has been completed, display control for distinguishing the task name of the task that is determined to have been completed from other task names.

In one aspect of the present invention, the speech data is text data indicating the speech to be made in the task, and the determining means includes means for converting the voice of the operator in the telephone answering service into text data and determines which task has been completed among the plurality of tasks corresponding to the plurality of task data items, based on a similarity between the text data indicating the voice of the operator and the text data indicating the speech to be made in the task.

The determination result display means may display an image indicating that the task is completed in association with a task name of the task that is determined to have been completed. Alternatively, the determination result display means may change a display manner of the task name of the task that is determined to have been completed.

In one aspect of the present invention, the determining means determines which task has been completed among the plurality of tasks corresponding to the plurality of task data items, further based on voice of a customer talking with the operator.

The determining means may determine if one or another task has been completed among the plurality of tasks corresponding to the plurality of task data items, if the voice of the customer corresponds to data stored in association with the customer.

Alternatively, the determining means may determine a correctness or incorrectness of the voice of the customer by inputting the data indicating the voice of the customer into a machine learning model, and determine if one or another task has been completed among the plurality of tasks corresponding to the plurality of task data items, based on the correctness or incorrectness.

In one aspect of the present invention, the telephone answering service support system further includes voice storing means for storing data indicating at least one of the voice of the operator or the voice of a customer talking with the operator in the speech made in the task in association with the task.

A telephone answering service support method according to the present invention includes storing a plurality of task data items, each task data item including a task name of a task in a telephone answering service, and speech data indicating speech to be made in the task, displaying a task name included in each of the plurality of task data items on a display of an operator engaged in the telephone answering service, determining which task has been completed among the plurality of tasks corresponding to the plurality of task data items, based on voice of the operator in the telephone answering service and speech data included in each of the plurality of task data items, and completing, in a case where it is determined that any of the tasks has been completed, display control for distinguishing the task name of the task that is determined to have been completed from other task names.

A program according to the present invention causes a computer to function as task data storing means for storing a plurality of task data items, each task data item including a task name of a task in a telephone answering service and speech data indicating speech to be made in the task, task display means for displaying a task name included in each of the plurality of task data items on a display of an operator engaged in the telephone answering service, determining means for determining which task has been completed among the plurality of tasks corresponding to the plurality of task data items, based on voice of the operator in the telephone answering service and speech data included in each of the plurality of task data items, and determination result display means for completing, in a case where it is determined that any of the tasks has been completed, display control for distinguishing the task name of the task that is determined to have been completed from other task names. The program may be stored in a computer-readable information storage medium, such as a semiconductor memory.

BRIEF DESCRIPTION OF THE DRAWINGS

FIG. 5 is a schematic diagram showing a question task list stored in a task list DB;

DETAILED DESCRIPTION OF THE INVENTION

An embodiment of the present invention will be described below with reference to the accompanying drawings.

Figure 1:
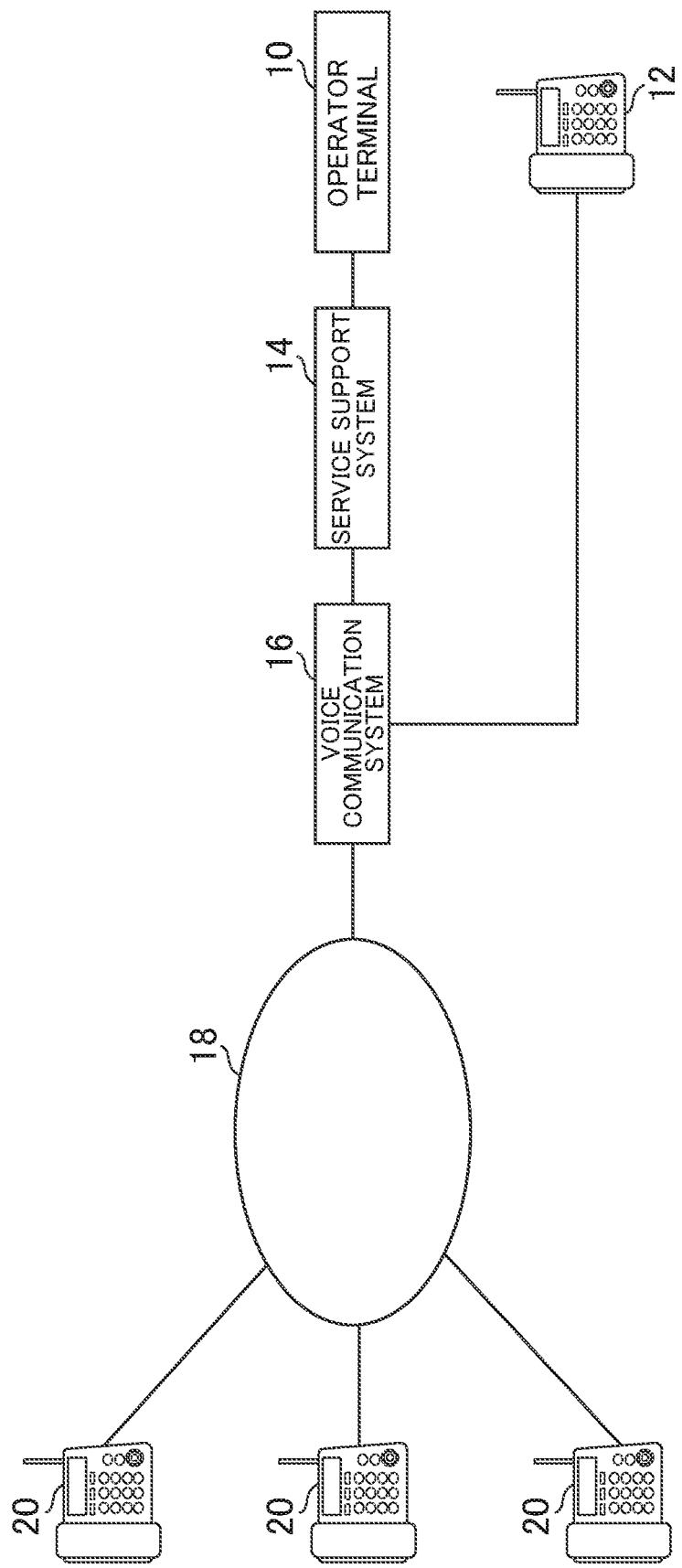
FIG. 1 is a diagram illustrating overall configuration of a call center according to an embodiment of the present invention.

FIG. 1 is a diagram illustrating overall configuration of a call center according to an embodiment of the present invention. The call center includes a voice communication system 16, a telephone answering service support system 14, an operator terminal 10, and an operator telephone 12. If the call center has many operators, one operator terminal 10 and one operator telephone 12 are provided for each operator. The voice communication system 16 is connected to a public telephone network 18 and relays voice communication with a customer telephone 20, which is a telephone used by the customer. For example, when there is an incoming call from the customer telephone 20, the call is assigned to one of the operator telephones 12. This allows the assigned operator telephone 12 to receive the call. In this case, the voice communication system 16 transmits speech data including the voice data from the customer telephone 20 and the voice data from the operator telephone 12 to the telephone answering service support system 14 in real time. The voice communication system 16 may further transmit the caller telephone number of the customer telephone 20 to the telephone answering service support system 14. The caller telephone number is used to identify the customer using the customer telephone 20. Here, an example will be described in which the present invention is applied to the call center service for receiving calls from customers, although the present invention may be similarly applied to the telemarketing service for making calls from the operator telephone 12 to prospective customers.

The telephone answering service support system 14 is mainly configured by a server computer, and displays various information on the operator terminal 10 so as to support the telephone answering service by the operator. The operator terminal 10 is mainly configured by a personal computer connected to the telephone answering service support system 14 via a network such as a LAN, and includes a display for presenting various information to the operator and an input device for inputting information as necessary. The operator provides the telephone answering service by talking with the customer using the operator telephone 12 while watching the operator screen displayed on the display of the operator terminal 10.

Figure 2:
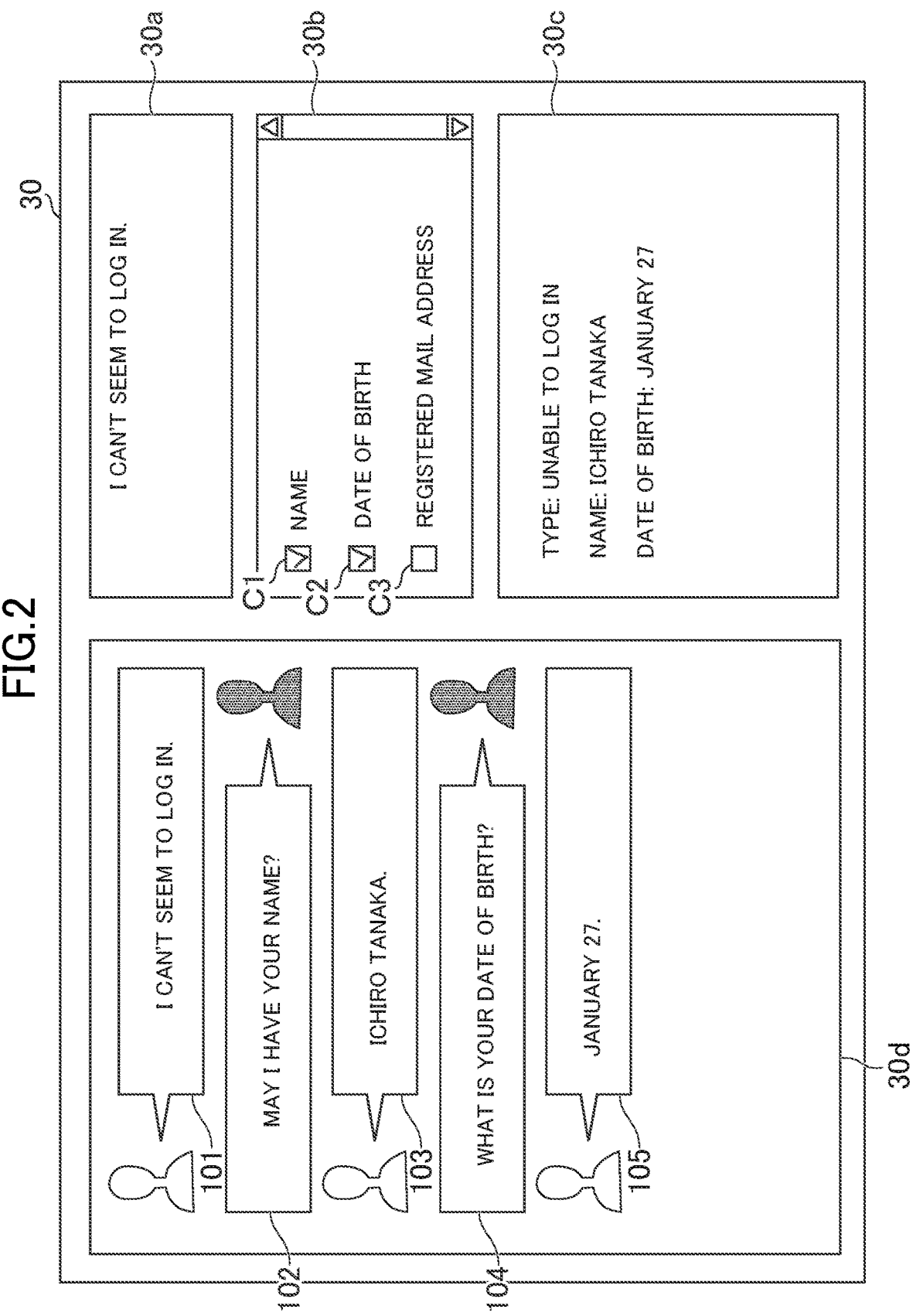
FIG. 2 is an example of a screen displayed on a display of an operator terminal.

FIG. 2 is an example of the operator screen displayed on the display of the operator terminal 10. In FIG. 2, the content of the operator screen 30 is generated by the telephone answering service support system 14, and when the content is transmitted to the operator terminal 10, the operator screen 30 is displayed on the display of the operator terminal 10.

The operator screen 30 includes an inquiry field 30a, a task list field 30b, a summary field 30c, and a conversation field 30d. The conversation field 30d is a field for displaying conversation between the operator and the customer in text. As described above, the speech data is transmitted from the voice communication system 16 to the telephone answering service support system 14, where the speech data is converted into text data format to be displayed in the conversation field 30d in time series. The voice communication system 16 distinguishes the voice data from the customer telephone 20 and the voice data from the operator telephone 12, and transmits the data to the telephone answering service support system 14. The text indicating the voice from the customer telephone 20 is displayed in a balloon pointing to the left side, and the text indicating the voice from the operator telephone 12 is displayed in a bubble pointing to the right side. Here, the customer's speech 101, 103, and 105 and the operator's speech 102 and 104 are alternately displayed.

The inquiry field 30a is a field for displaying an inquiry from the customer. Here, the telephone answering service support system 14 detects that the inquiry from the customer is the speech 101, and thus the content of the speech 101 is also displayed in the inquiry field 30a.

The task list field 30b is a field for displaying tasks to be performed by the operator together with check boxes. As will be described later, the tasks to be performed by the operator are previously stored in the database in association with the inquiry displayed in the inquiry field 30a. Here, in response to the customer's failed login attempt, the tasks of asking the customer about three items "name", "date of birth", and "registered mail address" are indicated. Although not shown, other tasks to specifically provide a login method to the customer may also be displayed in the task list field 30b with check boxes. Here, based on the speech 102 and 103, it is shown that the operator asks a name and the customer answers his/her name, and thus a check image "V" indicating that the task has been completed is added to a check box C1 next to the task name "name." Similarly, based on the speech 104 and 105, it is shown that the task is completed in which the operator asks the date of birth and the customer answers it, and thus the check image "V" indicating that the task has been completed is added to a check box C2 next to the task name "date of birth." On the other hand, neither the operator nor the customer has yet talked about a task name "registered mail address", and thus the check image "V" is not added to a check box C3.

Instead of adding the check image "V", a line may be added under the task name or a double line may be overlapped with the task name. When the task is completed, the display manner of the task name may be changed. For example, a display color of the task name may be changed, or the task name may be deleted or flashed.

Here, when the task is a question from the operator to the customer, the task is completed after the operator asks a question and the customer answers to the question, although the task may be completed when the operator asks a question regardless of whether the customer answers the question. The task may be completed only when the customer correctly answers a question from the operator.

The summary field 30c is a field for displaying a summary of the conversation displayed in the conversation field 30d. The summary field 30c may include the content or the summary of the inquiry displayed in the inquiry field 30a, or the content or the summary of the speech relating to the completed task. Here, the summary field 30c displays a summary of the speech 101, which is an inquiry, the completed task name "name" and the speech 103, which is the customer's answer, the completed task name "date of birth" and a summary of the speech 105, which is the customer's answer.

Figure 3:
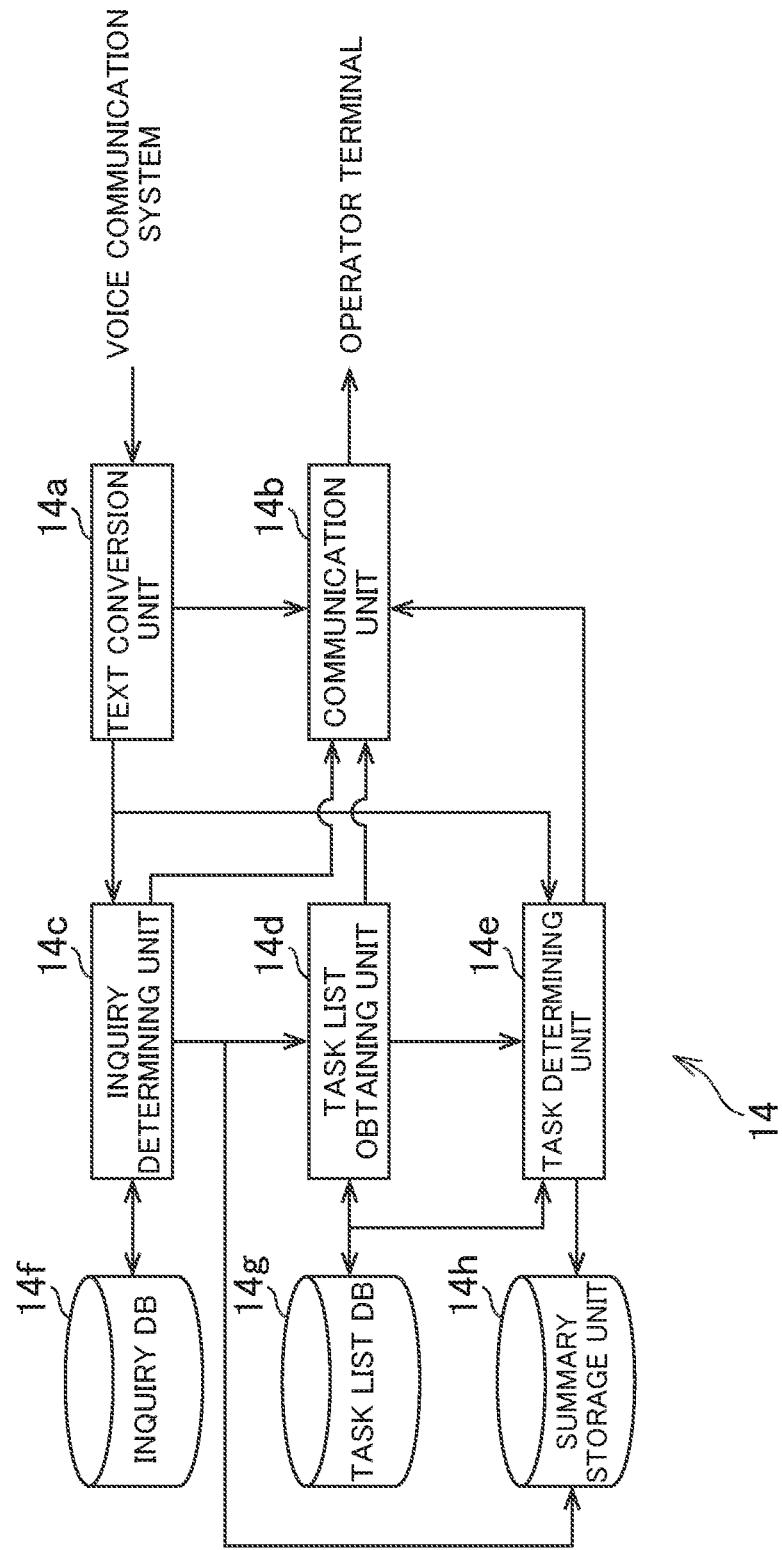
FIG. 3 is a functional block diagram of the telephone answering service support system.

FIG. 3 is a functional block diagram of the telephone answering service support system 14. As shown in FIG. 3, the telephone answering service support system 14 includes a text conversion unit 14a, a communication unit 14b, an inquiry determining unit 14c, a task list obtaining unit 14d, a task determining unit 14e, an inquiry DB (database) 14f, a task list DB 14g, and a summary storage unit 14h. As described above, the telephone answering service support system 14 is mainly configured by a server computer, and these functional blocks are implemented by executing a telephone answering service support program by the server computer. The program may be installed in the server computer via a communication line, such as the Internet, or may be installed from a computer-readable information storage medium, such as a semiconductor memory.

The text conversion unit 14a converts voice data received from the voice communication system 16 into a format of text data. As described above, the voice data includes the voice data from the customer telephone 20 and the voice data from the operator telephone 12, which are distinguished and supplied to the text conversion unit 14a by the voice communication system 16. This enables the text conversion unit 14a to separately output the text data indicating the voice of the customer and the text data indicating the voice of the operator. The text data indicating the voice of the customer and the text data indicating the voice of the operator are transmitted to the operator terminal 10 via the communication unit 14b, and the operator terminal 10 displays these texts in the conversation field 30d in time series. The communication unit 14b performs data communication with the operator terminal 10 over a network such as a LAN.

Figure 4:
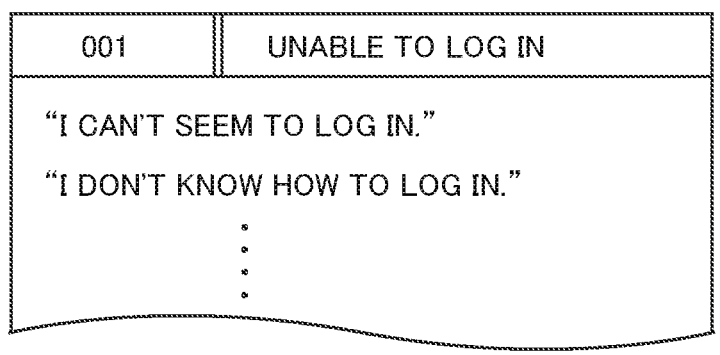
FIG. 4 is a schematic diagram showing storage of an inquiry DB.

The text data indicating the customer's voice is entered into the inquiry determining unit 14c and compared with inquiry sentences stored in the inquiry DB 14f, whereby it is determined whether the inquiry is an anticipated inquiry. FIG. 4 is a schematic diagram showing the storage of the inquiry DB 14f. As shown in FIG. 4, the inquiry DB 14f stores an inquiry name (in this case, "unable to log in") and a plurality of inquiry sentences of substantially the same content in a text format in association with an inquiry ID ("001" as an example) that identifies the inquiry content. The plurality of inquiry sentences is stored in order to address expression fluctuation. When the similarity between the text data entered from the text conversion unit 14a and any of the inquiry sentences stored in the inquiry DB 14f is a predetermined threshold value or more, the inquiry determining unit 14c provides an inquiry ID associated with such an inquiry sentence to the task list obtaining unit 14d. In this case, the text data indicating the voice of the customer is transmitted to the operator terminal via the communication unit 14b, and the operator terminal 10 displays the transmitted text data in the inquiry field 30a.

The task list obtaining unit 14d obtains a task list associated with the inquiry ID, which is provided by the inquiry determining unit 14c, from the task list DB 14g. Here, the task list includes a question task list and a guidance task list.

FIG. 5 is a schematic diagram showing the question task list. As shown in FIG. 5, the question task list includes an inquiry ID and a plurality of question task data items. Each inquiry task data includes a task ID (e.g., "A01" to "A03") of a task required to address an inquiry identified by the inquiry ID, a task name of the task (e.g., "name", "date of birth", "registered e-mail address"), and speech data indicating content of the speech to be made in the task. The speech data indicates an example of the operator's speech in inquiring the customer for required information and includes multiple text data items of substantially the same content. This is to address the expression fluctuation.

Figure 6:
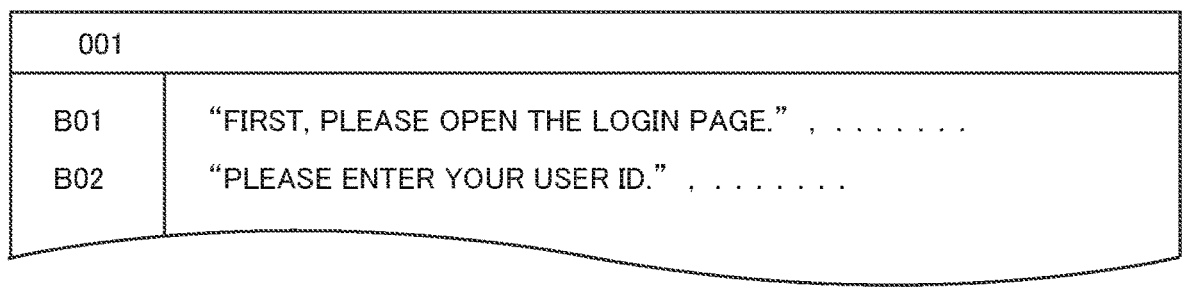
FIG. 6 is a schematic diagram showing a guidance task list stored in the task list DB.

Next, FIG. 6 is a schematic diagram showing the guidance task list. As shown in FIG. 6, the guidance task includes an inquiry ID and a plurality of guidance task data items. Each guidance task data includes a task ID (e.g., "B01" to "B02") of a guidance task required to address the inquiry identified by the inquiry ID, and speech data indicative of speech to be made in the task. The speech data indicates an example of the operator's speech in informing the customer of required information and includes multiple text data items of substantially the same content. This is to address the expression fluctuation.

Upon obtaining the inquiry task list and the guidance task list from the task list DB 14g, the task list obtaining unit 14d transmits the obtained lists to the operator terminal 10 via the communication unit 14b. The operator terminal 10 displays the lists in the task list field 30b of the display. Specifically, the operator terminal 10 displays the task names included in the question task list in the task list field 30b in a list format with check boxes. Further, one of the speech data items included in each guidance task data is displayed in the task list field 30b with a check box. This allows the operator to check what to speak to the customer while looking at the task list field 30b.

The task determining unit 14e determines which task has been completed based on the text data indicating the voice of the operator and the customer and the speech data included in the question task list or the guidance task list.

The text data indicating the voice of the operator is entered in the task determining unit 14e from the text conversion unit 14a. Further, the task list obtaining unit 14d is provided with an inquiry ID specified by the inquiry determining unit 14c, and obtains the inquiry task list and the guidance task list associated with such an inquiry ID from the task list DB 14g. Upon receiving text data indicating the operator's voice, the task determining unit 14e checks whether the text data is similar to the speech data contained in either the obtained inquiry task list or guidance task list. For example, if any of the speech data and the text data indicating the voice of the operator are similar to each other by a predetermined threshold value or more, it is determined that both data are similar. When such speech data is detected, it is determined that the task corresponding to the speech data has been completed. In this case, the task determining unit 14e transmits the task ID of the completed task to the operator terminal 10 via the communication unit 14b. In response, the operator terminal 10 changes the content displayed in the task list field 30b to indicate that the task specified by the received task ID has been completed. For example, in FIG. 2, a check image is added to the empty check box placed next to the task name of the completed task.

If the operator asks the customer a question included in the question task list, the task determining unit 14e may obtain text data indicating the customer's voice from the text conversion unit 14a to determine whether the customer has correctly answered the question based on the obtained text data. In this case, it may be determined that the task has been completed when the customer answers the operator's question correctly.

For example, when the operator asks the registered information of the customer, such as "name", "birth date", and "registered mail address", it may be determined whether the text data indicating the voice of the customer includes the registered information recorded in a customer DB (not shown). If the text data indicating the voice of the customer includes the registered information recorded in the customer DB, the task determining unit 14e may determine that the customer has correctly answered the question and that the task has been completed.

Alternatively, the task determining unit 14e may use a machine learning model to determine whether the customer has correctly answered the operator's questions. The machine learning model may be prepared for each question, for example, and trained in advance with training data in which a correct answer is a positive example and an incorrect (not appropriate) answer is a negative example. The task determining unit 14e enters text data indicating the customer's answer into the machine learning model corresponding to the operator's question, thereby determining whether the answer is correct. If it is determined that the answer is correct, the task in the question task list may be determined to be completed.

Upon determining that the task has been completed, the task determining unit 14e generates a summary of the task and transmits the generated summary to the operator terminal 10 via the communication unit 14b. The operator terminal 10 additionally displays the summary in the summary field 30c. The summary displayed in this manner is stored in the summary storage unit 14h configured by data storage means such as an HDD or an SSD. The summary of the telephone answering service stored in the summary storage unit 14h is checked, it is thereby possible to verify afterward whether the operator correctly performed the telephone answering service.

Figure 7:
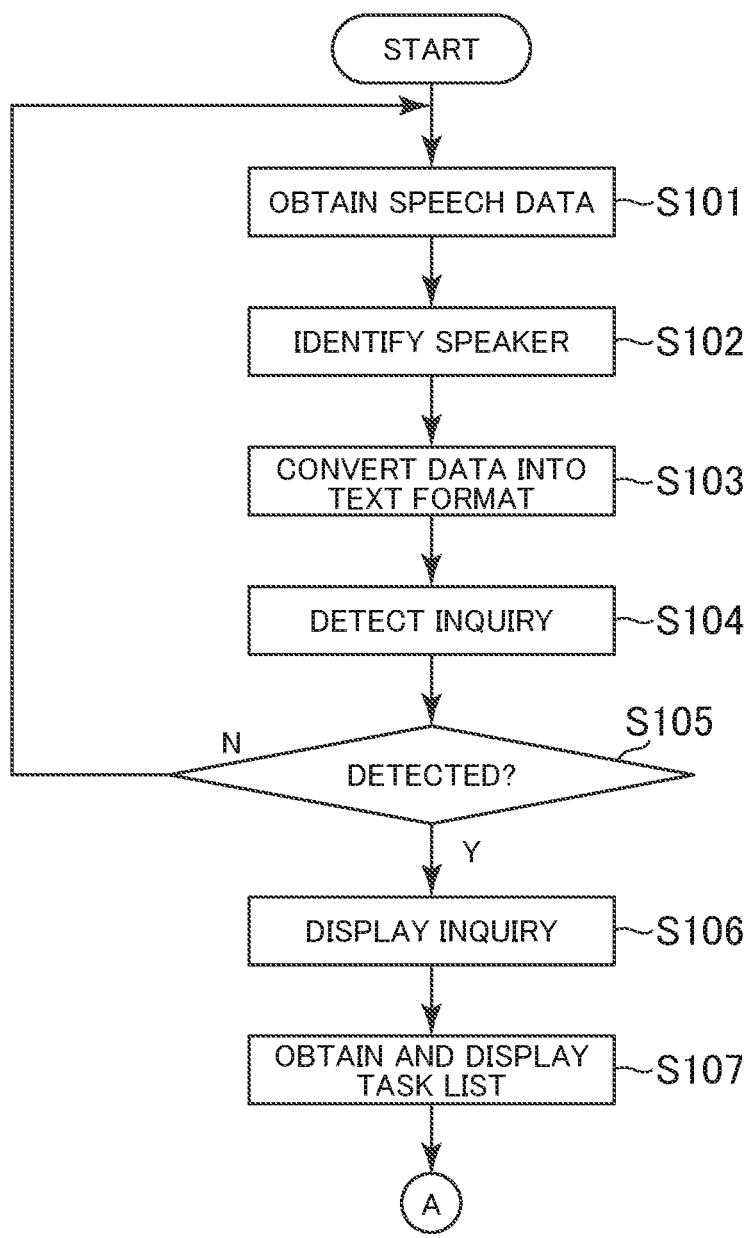
FIG. 7 is an operational flow chart of the telephone answering service support system.
Figure 8:
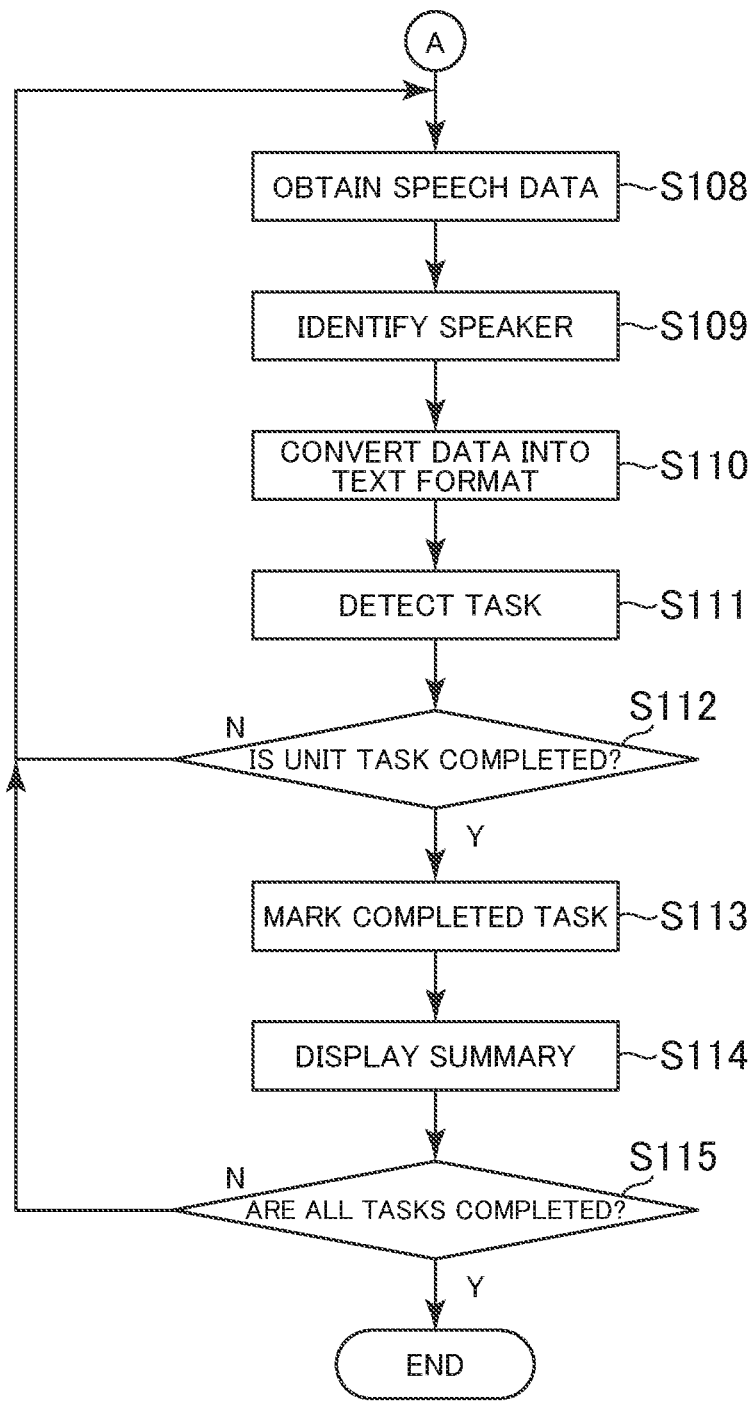
FIG. 8 is an operational flow chart of the telephone answering service support system.

FIGS. 7 and 8 are operational flow charts of the telephone answering service support system 14. When there is an incoming call from the customer telephone 20, the voice communication system 16 transmits voice data of the customer or the operator and speaker information indicating whether the voice data is from the customer or the operator to the business support system 14 (S101). The telephone answering service support system 14 identifies the speaker by the speaker information, and the text conversion unit 14a converts the voice data into text format data (S103). Subsequently, if the speaker information indicates a customer, the inquiry determining unit 14c uses the text data indicating the customer's voice to determine whether the inquiry is an anticipated inquiry (S104). If the text data indicating the customer's voice is not an anticipated inquiry (S105), the system returns to S101. If the text data indicating the voice of the customer is an anticipated inquiry (S105), the operator terminal 10 displays the text data related to the inquiry in the inquiry field 30a (S106). Further, the inquiry name stored in the inquiry DB 14f is displayed on the first line in the summary field 30c. A summary of the text data indicating the voice of the customer may be displayed in the summary field 30c instead of the inquiry name. The task list obtaining unit 14d obtains a task list corresponding to the inquiry from the task list DB14, and the operator terminal 10 displays the task list in the task list field 30b (S107).

Subsequently, the telephone answering service support system 14 again obtains the voice data of the customer and the operator and the speaker information from the voice communication system 16 (S108). The telephone answering service support system 14 identifies the speaker by the speaker information (S109), and convers the voice data into text format data by the text conversion unit 14a (S110).

The task determining unit 14e then determines whether the text data indicating the voice of the operator obtained in S109 is similar to any of the speech data included in the task list obtained in S106 (S111). If they are similar, the task determining unit 14e then determines whether a task included in the task list has been completed (S112). For example, in a case of a task included in the question task list, the task may be determined to be completed when a question is asked or when a question is asked and answered correctly. If the task has not been completed, the system returns to S108. If the task has been completed, a task ID of the completed task is transmitted to the operator terminal 10. In response to the transmitted task ID, the operator terminal 10 updates the task list field 30b to display that the task specified by the task ID has been completed (S113).

Further, the task determining unit 14e generates a summary of the completed task and sends the generated summary to the operator terminal 10. This enables the operator terminal 10 to additionally display the summary of the completed task in the summary field 30c (S114). The processing of the above S108 to S114 continues until all of the tasks in the task list are completed (S115).

According to the telephone answering service support system 14 described above, the task list corresponding to the inquiry from the customer is displayed in the task list field 30b, and the completed task is displayed so as to be distinguished from other tasks, and thus the operator of the telephone answering service can perform a plurality of tasks, such as questions and guidance, without omission.

The present invention is not limited to the above embodiment, and various modifications are included in the scope thereof.

What is claimed is:

1. A telephone answering service support system comprising a server computer on which a telephone answering service support program has been installed, the telephone answering service support program, when executed by the server computer, causes the server computer to:
   store a plurality of task data items, each task data item including a task name of a task in a telephone answering service, and speech data indicating speech to be made in the task;
      wherein the speech data is in a format of text data;
   display a task name included in each of the plurality of task data items on a graphical user interface of an operator engaged in the telephone answering service;

wherein the task name of each of the plurality of task data items is displayed with a status graphical user interface control element indicating whether the task data item has been completed;

wherein the task name of each of the plurality of task data items is displayed in a first state in which the status graphical user interface control element for at least one of the plurality of task data items indicates that the task data item has not been completed;

convert a voice of the operator in the telephone answering service into voice data, wherein the voice data is in the format of text data;

determine which of the plurality of task data items has been completed based on a similarity between the voice data and the speech data; and execute, in a case where it is determined that any of the task data items has been completed, display control for displaying on the graphical user interface a second state in which the status graphical user interface control element indicating that the at least one of the plurality of task data items that had not been completed in the first state has been completed.

2. The telephone answering service support system according to claim 1, wherein the telephone answering service support program further causes the server computer to:

display an image indicating that the task is completed in association with a task name of the task that is determined to have been completed.

3. The telephone answering service support system according to claim 1, wherein the telephone answering service support program further causes the server computer to:

change a display manner of the task name of the task that is determined to have been completed.

4. The telephone answering service support system according to claim 1, wherein the telephone answering service support program further causes the server computer to:

determine which task has been completed among the plurality of tasks corresponding to the plurality of task data items, further based on voice of a customer talking with the operator.

5. The telephone answering service support system according to claim 4, wherein the telephone answering service support program further causes the server computer to:

determine if one or another task has been completed among the plurality of tasks corresponding to the plurality of task data items, if the voice of the customer corresponds to data stored in association with the customer.

6. The telephone answering service support system according to claim 4, wherein the telephone answering service support program further causes the server computer to:

determine a correctness or incorrectness of the voice of the customer by inputting the data indicating the voice of the customer into a machine learning model, and determine if one or another task has been completed among the plurality of tasks corresponding to the plurality of task data items, based on the correctness or incorrectness.

7. The telephone answering service support system according to claim 1, wherein the telephone answering service support program further causes the server computer to:

store data indicating at least one of the voice of the operator or the voice of a customer talking with the operator in the speech made in the task in association with the task.

8. The telephone answering service support system according to claim 1, wherein each task data item is an operator's task in the telephone answering service between a customer and the operator.

9. The telephone answering service support system according to claim 1, wherein the speech data corresponds to one of the stored plurality of task data items.

10. The telephone answering service support system according to claim 1, wherein the plurality of task data items are previously stored.

11. The telephone answering service support system according to claim 1, wherein the speech data includes a plurality of text data items;

wherein each of the plurality of text data items are within a similarity threshold of each other.

12. The telephone answering service support system according to claim 1, wherein the speech data is exemplary speech to be made by the operator.

13. A telephone answering service support method comprising:

storing a plurality of task data items, each task data item including a task name of a task in a telephone answering service, and speech data indicating speech to be made in the task;

wherein the speech data is in a format of text data;

displaying a task name included in each of the plurality of task data items on a graphical user interface of an operator engaged in the telephone answering service;

wherein the task name of each of the plurality of task data items is displayed with a status graphical user interface control element indicating whether the task data item has been completed;

wherein the task name of each of the plurality of task data items is displayed in a first state in which the status graphical user interface control element for at least one of the plurality of task data items indicates that the task data item has not been completed;

converting a voice of the operator in the telephone answering service into voice data, wherein the voice data is in the format of text data;

determining which of the plurality of task data items has been completed based on a similarity between the voice data and the speech data; and executing, in a case where it is determined that any of the task data items has been completed, display control for displaying on the graphical user interface a second state in which the status graphical user interface control element indicating that the at least one of the plurality of task data items that had not been completed in the first state has been completed.

14. A non-transitory computer readable storage medium storing a telephone answering service support program, which when executed by a server computer, causes the server computer to:

store a plurality of task data items, each task data item including a task name of a task in a telephone answering service, and speech data indicating speech to be made in the task;

wherein the speech data is in a format of text data;

display a task name included in each of the plurality of task data items on a graphical user interface of an operator engaged in the telephone answering service;

wherein the task name of each of the plurality of task data items is displayed with a status graphical user interface control element indicating whether the task data item has been completed;
wherein the task name of each of the plurality of task data items is displayed in a first state in which the status graphical user interface control element for at least one of the plurality of task data items indicates that the task data item has not been completed;
convert a voice of the operator in the telephone answering service into voice data, wherein the voice data is in the format of text data;
determine which of the plurality of task data items has been completed based on a similarity between the voice data and the speech data; and
execute, in a case where it is determined that any of the task data items has been completed, display control for displaying on the graphical user interface a second state in which the status graphical user interface control element indicating that the at least one of the plurality of task data items that had not been completed in the first state has been completed.

* * * * *